United States Patent
Merritt et al.

(10) Patent No.: US 6,311,251 B1
(45) Date of Patent: Oct. 30, 2001

(54) SYSTEM FOR OPTIMIZING DATA STORAGE IN A RAID SYSTEM

(75) Inventors: Perry Wayde Merritt, Broomfield; June Mullins, Denver; Ian Fraiser Reeve, Thornton; Paul David VonBehren, Boulder; Kenneth L. Willis, Louisville, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/197,960

(22) Filed: Nov. 23, 1998

(51) Int. Cl.$^7$ ................................................. G06F 12/00
(52) U.S. Cl. ................................................................ 711/114
(58) Field of Search ................................... 711/114, 172; 714/6, 7

(56) References Cited

U.S. PATENT DOCUMENTS

| | | |
|---|---|---|
| 5,430,855 | 7/1995 | Walsh et al. ............................ 395/275 |
| 5,542,065 * | 7/1996 | Burkes et al. ........................ 711/114 |
| 5,574,851 * | 11/1996 | Rathunde ................................ 714/7 |
| 5,696,934 | 12/1997 | Jacobson et al. ..................... 395/441 |
| 5,754,756 * | 5/1998 | Watanabe et al. ...................... 714/6 |
| 5,860,091 * | 1/1999 | Dekoning et al. .................. 711/114 |
| 6,016,552 * | 1/2000 | Lee et al. ............................... 714/6 |

\* cited by examiner

Primary Examiner—Kevin Verbrugge
Assistant Examiner—Jasmine Song
(74) Attorney, Agent, or Firm—Duft, Graziano & Forest; Wayne P. Bailey

(57) ABSTRACT

The intelligent data storage manager functions to optimize the data storage utilization in a RAID data storage subsystem that is equipped with a heterogeneous mix of data storage elements. This is accomplished by using preference groups and biasing the writing of stripes of data in the redundancy groups of the RAID system to the disk drive or a set of disk drives in the preference group that have the greatest available data storage capacity. This ensures that the data storage capacity of the the disk drive with the largest available capacity is utilized to the maximum capacity. A preference group comprises a group of disk drives that is larger than the stripe size that is used to store data in a RAID format. The data storage manager does not write data across all of the disk drives in the preference group at a time, but rotates the collection of disk drives that are used to write a stripe of data. Therefore, if there is a failure of one of the disks in the RAID preference group, only a portion of the stripes stored therein need to be reconstructed, thereby speeding the reconstruction process. By including the the disk drive(s) with the largest available capacity in every stripe that is written to the preference group, the data storage capacity of the disk drive with the largest available capacity is preferentially used in the storage of data, thereby using this excess capacity first, with the utilization of the data storage capacity of this disk drive being related to the ratio of the preference group size to the RAID stripe size.

10 Claims, 3 Drawing Sheets

| | H4 | | | |
|---|---|---|---|---|
| | G4 | | | |
| G3 | F4 | H1 | H2 | H3 |
| F2 | E4 | G1 | F3 | G2 |
| E1 | D4 | F1 | E2 | E3 |
| D1 | C3 | D2 | C4 | D3 |
| C1 | B2 | B3 | B4 | C2 |
| A1 | A2 | A3 | A4 | B1 |
| d1 | d2 | d3 | d4 | d5 |

| F1 | F2 | F3 | F4 | F5 |
| E1 | E2 | E3 | E4 | E5 |
| D1 | D2 | D3 | D4 | D5 |
| C1 | C2 | C3 | C4 | C5 |
| B1 | B2 | B3 | B4 | B5 |
| A1 | A2 | A3 | A4 | A5 |
| d1 | d2 | d3 | d4 | d5 |

FIG. 3

| | d1 | d2 | d3 | d4 | d5 | d6 | d7 | d8 | d9 | d10 | d11 | d12 |
|---|---|---|---|---|---|---|---|---|---|---|---|---|
| | | | | L3 | L4 | L5 | M1 | M2 | M3 | M4 | M5 | |
| | | | | J4 | J5 | K1 | K2 | K3 | K4 | K5 | L1 | L2 |
| | H2 | H3 | H4 | H5 | I1 | I2 | I3 | I4 | I5 | J1 | J2 | J3 |
| | E5 | F1 | F2 | F3 | F4 | F5 | G1 | G2 | G3 | G4 | G5 | H1 |
| | C3 | C4 | C5 | D1 | D2 | D3 | D4 | D5 | E1 | E2 | E3 | E4 |
| | A1 | A2 | A3 | A4 | A5 | B1 | B2 | B3 | B4 | B5 | C1 | C2 |

FIG. 4

| | d1 | d2 | d3 | d4 | d5 | d6 | d7 | d8 | d9 | d10 | d11 | d12 |
|---|---|---|---|---|---|---|---|---|---|---|---|---|
| | | | | | | | | | | Q2 | Q3 | Q1 |
| | | | | | | | | | | P2 | P3 | P1 |
| | | | | | | | | | | O2 | O3 | O1 |
| | | | | | | | | | | N2 | N3 | N1 |
| | | | | L3 | L4 | L5 | M1 | M2 | M3 | M4 | M5 | L2 |
| | | | | J4 | J5 | K1 | K2 | K3 | K4 | K5 | L1 | J3 |
| | H2 | H3 | H4 | H5 | I1 | I2 | I3 | I4 | I5 | J1 | J2 | H1 |
| | E5 | F1 | F2 | F3 | F4 | F5 | G1 | G2 | G3 | G4 | G5 | E4 |
| | C3 | C4 | C5 | D1 | D2 | D3 | D4 | D5 | E1 | E2 | E3 | C2 |
| | A1 | A2 | A3 | A4 | A5 | B1 | B2 | B3 | B4 | B5 | C1 | |

|     | H4 |    |    |    |
| --- | --- | --- | --- | --- |
|     | G4 |    |    |    |
| G3 | F4 | H1 | H2 | H3 |
| F2 | E4 | G1 | F3 | G2 |
| E1 | D4 | F1 | E2 | E3 |
| D1 | C3 | D2 | C4 | D3 |
| C1 | B2 | B3 | B4 | C2 |
| A1 | A2 | A3 | A4 | B1 |
| d1 | d2 | d3 | d4 | d5 |

*FIG. 5*

SYSTEM FOR OPTIMIZING DATA STORAGE IN A RAID SYSTEM

FILED OF THE INVENTION

This invention relates to data storage subsystems and, in particular, to a virtual data storage subsystem which includes a data storage manager that functions to optimize the data storage utilization in a RAID data storage subsystem that is equipped with a heterogeneous mix of data storage elements.

PROBLEM

It is a problem in the field of data storage subsystems to store the ever increasing volume of application data in an efficient manner, especially in view of the rapid changes in data storage characteristics of the data storage elements that are used to implement the data storage subsystem.

Data storage subsystems traditionally comprised homogeneous collections of data storage elements on which the application data was stored. Within this data storage architecture, it has always been difficult to accommodate data storage elements that differ from those presently in use in the data storage subsystem. The virtual data storage subsystems were more adept at addressing this issue, since the physical data storage elements were mapped into logical devices to present a desired data storage image to the host processors. A popular virtual data storage subsystem architecture is the Redundant Array of Independent Disks (RAID) concept which spread the data set over a set of parallel connected disk drives to emulate the operation of a large capacity disk drive. In this architecture, the disk drives were uniform in data storage characteristics in a selected redundancy group, as a set of the parallel connected disk drives were termed.

An exception to this need for homogeneity in a redundancy group is disclosed in U.S. Pat. No. 5,430,855 titled "Disk Drive Array Memory System Using Nonuniform Disk Drives," which discloses a data storage subsystem that uses an array of data storage elements that vary in their data storage characteristics and/or data storage capacity. The data storage manager in this data storage subsystem automatically compensates for any nonuniformity among the disk drives by selecting a set of physical characteristics that define a common data storage element format. However, the data storage utilization of the redundancy groups formed by the data storage manager is less than optimal, since the least common denominator data storage characteristics of the set of disk drives is used as the common disk format. Thus, disk drives whose data storage capacity far exceeds the smallest capacity disk drive in the redundancy group suffers from loss of utilization of its excess data storage capacity. Therefore, many data storage subsystems simply configure multiple redundancy groups, with each redundancy group comprising a homogeneous set of disk drives. A problem with such an approach is that the data storage capacity of the data storage subsystem must increase by the addition of an entire redundancy group. Furthermore, the replacement of a failed disk drive requires the use of a disk drive that matches the characteristics of the remaining disk drives in the redundancy group, unless loss of the excess data storage capacity of the newly added disk drive were incurred, as noted above.

U.S. Pat. No. 5,696,934, titled "Method of Utilizing Storage Disks of Differing Capacity in a Single Storage Volume in a Hierarchical Disk Array" discloses a system for utilizing the data storage capacity of a heterogeneous set of disk drives by segmenting the disks into multiple regions. The non-contiguous regions from individual disks are linked to form either a RAID 1 or a RAID 5 logical device. In particular, the system uses two disks of the largest data storage capacity in a redundancy group so that the excess data storage capacity of these two disks is configured as a RAID 1 mirrored disk portion of memory. The remaining segment of the data storage capacity of the largest storage capacity disk drives matches the data storage capacity of the remaining disk drives in the redundancy group and these disk drives are then configured as RAID 5 or other combinations of RAID 1 and RAID 5. However, this system is limited to the use of the excess data storage capacity of the disk drives as a RAID 1 memory and pairs of the largest storage capacity disk drives must be used in the redundancy group.

Thus, it is a prevalent problem in data storage subsystems that the introduction of new technology is costly and typically must occur in fairly large increments, occasioned by the need for the data storage subsystem to be comprised of homogeneous data storage devices, even in a virtual data storage subsystem. Therefore, data administrators find it difficult to cost effectively manage the increasing volume of data that is being generated in order to meet the needs of the end users' business. In addition, the rate of technological innovation is accelerating, especially in the area of increased in data storage capacity and the task of incrementally integrating these new solutions into existing data storage subsystems is difficult to achieve.

SOLUTION

The above described problems are solved and a technical advance achieved by the present intelligent data storage manager that functions to optimize the data storage utilization in a RAID data storage subsystem that is equipped with a heterogeneous mix of data storage elements. This is accomplished by using preference groups and biasing the writing of stripes of data in the redundancy groups of the RAID system to the disk drive or a set of disk drives in the preference group that have the greatest available data storage capacity. This ensures that the data storage capacity of the the disk drive with the largest available capacity is utilized to the maximum capacity.

A preference group comprises a group of disk drives that is larger than the stripe size that is used to store data in a RAID format. The data storage manager does not write data across all of the disk drives in the preference group at a time, but rotates the collection of disk drives that are used to write a stripe of data. Therefore, if there is a failure of one of the disks in the RAID preference group, only a portion of the stripes stored therein need to be reconstructed, thereby speeding the reconstruction process. By including the the disk drive(s) with the largest available capacity in every stripe that is written to the preference group, the data storage capacity of the disk drive with the largest available capacity is preferentially used in the storage of data, thereby using this excess capacity first, with the utilization of the data storage capacity of this disk drive being related to the ratio of the preference group size to the RAID stripe size.

BRIEF DESCRIPTION OF THE DRAWINGS

FIG. 1 illustrates in block diagram form the overall architecture of a data storage subsystem in which the present intelligent data storage manager is implemented;

FIGS. 2–5 illustrate in graphical form the management of data storage in the data storage subsystem of FIG. 1 in which the present intelligent data storage manager is implemented.

DETAILED DESCRIPTION

Figures 1, 2:
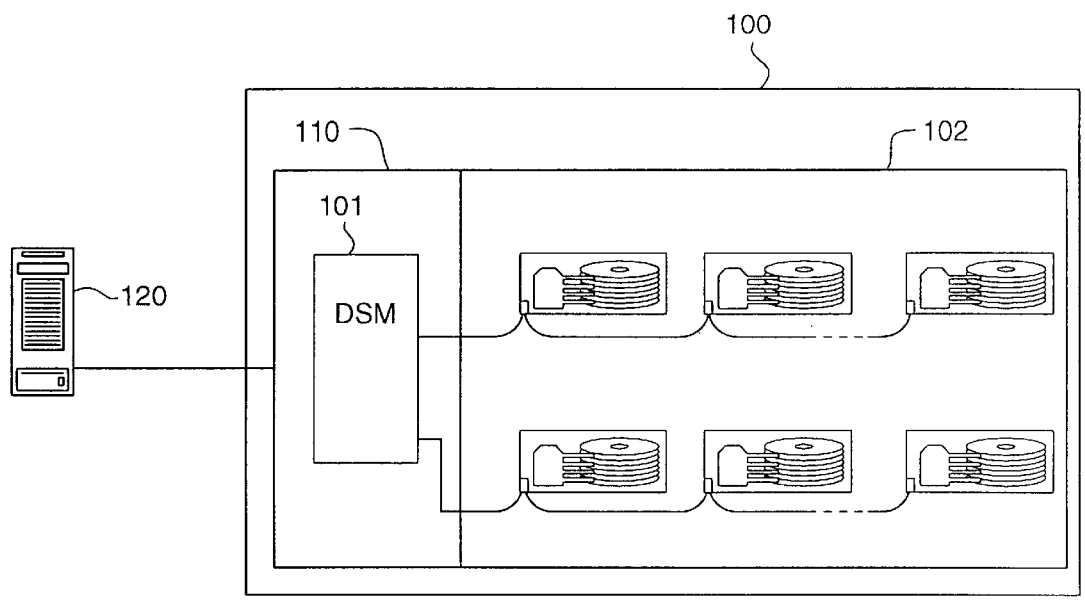

FIG. 1 illustrates in block diagram form the overall architecture of a data storage subsystem 100 in which the present intelligent data storage manager 101 is implemented. The data storage subsystem 100 comprises a front end controller 110 which manages the storage and retrieval of data on the back-end disk drives 102 for at least one host processor 120. The front end controller 110 is located between the host processors 120 and the back-end data storage disks 102. The front end controller 110 performs address mapping of the data sets wherein host extents of a data set that are defined in terms of Virtual Logical Unit Number and Logical Block Address are mapped by the front end controller 110 to a selected extent of physical storage in the back-end data storage disks 102. A Virtual LUN is a logical extent of the back-end disk storage capacity that is presented to a host processor 120 as a logical disk which allows the data storage subsystem 100 to present the host processor 120 with a disk image while allowing the data storage subsystem 100 to store data on the media best suited for the data.

RAID CONCEPT

The RAID concept is to interconnect a plurality of the back-end disk drives 102 in a parallel connected arrangement, illustrated in FIG. 2, to thereby spread the storage of the data set that is received from the host processor 120 across multiple disk drives d1–d5, to thereby emulate the operation of a large capacity disk drive and obtain the increased data access speed offered by the use of multiple parallel connected actuators. This is accomplished by writing the data set in a stripe A1–A5 across the multiple disk drives d1–d5.

In a RAID system, a strip (A1 of disk drive d1, for example) is an extent of contiguous blocks of data storage located on a single disk. A collection of strips A1–A5 from a predetermined number of different disk drives d1–d5 comprises a stripe. Within the RAID concept are a plurality of variations of data storage philosophy. RAID 5 is an architecture that provides data reliability at a reasonable cost. The data reliability is provided by writing data in a stripe format across a plurality of the disk drives d1–d5 that comprise a redundancy group and then calculating the parity or other error detection/correction factor (termed "redundancy data") for the data and writing the redundancy data on the remaining disk drive(s) in the stripe. The reliability of this scheme is enhanced by distributing the redundancy data across all of the disk drives in the redundancy group. This method provides good data throughput as well as good data reliability, with a modest increase in cost to obtain some data protection. In traditional RAID 5, there is no address map since the physical location of the data on the disk drives d1–d5 of the redundancy group is determined by a fixed algorithm. A simple mathematical function is used to convert host processor addresses to the physical data storage addresses in the back-end disk drives 102 of the data storage subsystem 100. However, all disk drives in this architecture must have same data storage capacity. If one disk drive, such as disk drive d2 of FIG. 2, is a disk drive having a greater data storage capacity than the remaining disk drives d1, d3–d5 of the redundancy group, then the additional data storage capacity of the large disk drive d2 cannot be used.

DATA STORAGE MANAGEMENT OPTIONS

In order to improve the data storage capacity utilization of the disk drives that are used to implement a RAID memory, where the disk drives are non-homogeneous in their data storage capacity, the data storage manager 101 implements a selected one or combination of data storage efficiency processes. The selection of the particular process used can be done manually by the data storage administrator, or can be automatically implemented by the data storage manager 101 as a function of the particular combination of disk drives that are installed in the back-end disk drives 102. The three basic philosophies that are used comprise: preference groups using a small stripe size, variable stripe sizes, and biasing the stripe writing to the disk drives in the preference group having the largest data storage capacity. In this description, the term "preference group" is used and reflects a data reliability structure on which the present data storage efficiency processes can be applied. The preference group (FIG. 3) is a subset of disk drives d1–d12 of the data storage subsystem that contains all strips of all the stripes of a group of data files that are stored in the data storage subsystem. The objective of the preference group is to minimize the statistical likelihood that the failure of multiple disk drives will cause the loss of data that is stored in the data storage subsystem. For example, if a disk drive fails in a first preference group, then RAID data reconstruction takes place and there is no loss of data. If a second disk drive fails in a second preference group while this data reconstruction is taking place in the first preference group, then there is also no loss of data since RAID data reconstruction also takes place in the second preference group and there is no loss of data. In contrast, if all of the disk drives were grouped together, there is a likelihood that some stripe of data will span both failed disk drives and data would be lost, since the RAID data reconstruction is directed to recovery of data from single disk drive failures.

The first of these philosophies is illustrated in FIG. 3 wherein a collection of disk drives d1–d12 is configured into multiple preference groups (as shown in FIG. 1), with a single one of these preference groups being shown in FIG. 3. The data storage manager 101 selects a small stripe size to write the data to the various disk drives d1–d12 of this preference group. The stripes A–M are each comprised of five strips (A1–A5 for example) and the stripes A–M of data are written across any of the disk drives d1–d12, with the only prerequisite being that data from this stripe has not already been written to this disk drive. In the example of FIG. 3, the stripes A–M are distributed uniformly across the various disk drives d1–d12 until there is insufficient data storage capacity to write the next stripe across the required number of different disk drives (five). At this point, the data storage manager 101 can either cease writing data to this preference group or alternatively can implement the second of the data storage efficiency philosophies and decrease stripe size (three) to fit the data storage capacity of the larger data storage capacity disk drives d10–d12, as shown in FIG. 4. The data storage manager 101 can adapt the stripe size to the space available on the disk drives d10–d12. This approach writes stripes A–M across all of the disk drives d1–d12 until the disks of lesser capacity are completely consumed. The size of the stripe N–Q written is then reduced to match the number of larger data storage capacity disk drives d10–d12 that have data storage capacity available.

The third of these data storage philosophies is the Biased Placement, illustrated in FIG. 5, which manages the placement of stripes so strips are preferentially placed on the disk drive d2 with the largest available capacity while also being written on the smaller disk drives d1, d3–d5 in the RAID format. Biasing is a predictive strategy, since the more stripes that are placed with this approach, the greater the memory utilization of the largest data storage capacity disk drives. Furthermore, the exhaustion of the data storage capacity of the disk drive d2 with the largest available capacity, if the redundancy group is large enough, results in the data storage manager 101 selecting the next disk drive with the largest unused data storage capacity and repeating the biased placement philosophy by writing stripes on the disk drives with the preference being to include the disk drive with the largest available capacity in every stripe written. While this description uses the term "disk drive" it is envisioned that this term as well as the term "data storage element" encompasses the use of subset(s) of the disk drives in the preference group. For example, the preference group can be divided into a number of subsets of disk drives, each subset being comprised of disk drives having available capacity that is substantially equivalent. Alternatively, the preference group can be divided into n subsets, wherein each subset represents a predetermined portion of the preference group, such as 3 subsets which respectively comprise ¼, ¼, ½ of the disk drives, ordered by descending available storage capacity. There are numerous combinations and alternatives to these examples and they simply represent obvious variations of the underlying Biased Placement philosophy and are intended to be encompasses by the language of the claims attached hereto.

The three philosophies can be combined, in that the stripes can be written with a bias until there is insufficient data storage capacity to write the next stripe across the required number of different disk drives. At that point, the stripe size can be reduced to use the remaining data storage capacity to write the next stripe across the new number of different disk drives. In addition, the management of this process can be simplified by constraining the number of types of disk drives that are used to implement the data storage subsystem 100 to prevent excessive diversity of disk drive capacity, and the disk drives can be grouped in the preference groups by capacity to further simplify the data storage management process. In any case, the above-noted data storage efficiency processes are effective to increase the memory utilization of the disk drives that are used to implement a preference group.

SUMMARY

The present intelligent data storage manager therefore functions to optimize the data storage utilization in a RAID data storage subsystem that is equipped with a heterogeneous mix of data storage elements. This is accomplished by using preference groups and biasing the writing of stripes of data in the redundancy groups of the RAID system to the disk drives in the preference group that have the greatest data storage capacity. This ensures that the data storage capacity of the largest capacity disk drives is utilized to the maximum capacity.

What is claimed:

1. A data storage manager operational in a data storage subsystem that uses a plurality of data storage elements that are non-homogeneous in data storage capacity for the storage of data thereon for at least one host processor, comprising:

means, responsive to the presence of a first data storage element in said plurality of data storage elements that has the greatest data storage capacity of said plurality of data storage elements, for configuring a preference group comprising N data storage elements, inclusive of said first data storage element; and means for writing data received from a host processor in stripes across less than N of said data storage elements of said preference group.

2. The data storage manager of claim 1 wherein said means for writing comprises:

means for preferentially including said first data storage element in said stripes used to write data received from a host processor across less than N of said data storage elements of said preference group.

3. The data storage manager of claim 2 wherein said means for writing further comprises:

means, responsive to data storage capacity of said first data storage element being exhausted, for selecting a second data storage element that has the greatest data storage capacity of the remaining ones of said data storage elements in said preference group; and means, responsive to data storage capacity of said first data storage element being exhausted, for preferentially including said second data storage element in said stripes used to write data received from a host processor across less than N of said data storage elements of said preference group.

4. The data storage manager of claim 2 wherein said means for writing further comprises:

means, responsive to data storage capacity of said N data storage elements being less than a size of said stripes, for selecting a second size of said stripes, said second size being less than said first size.

5. The data storage manager of claim 1 wherein said means for writing comprises:

means for selecting a first size of said stripes, said first size being less than N; and means, responsive to data storage capacity of a plurality of said N data storage elements being exhausted, for selecting a second size of said stripes, said second size being less than said first size.

6. A method of operating a data storage manager that is operational in a data storage subsystem that uses a plurality of data storage elements that are non-homogeneous in data storage capacity to implement at least one preference group, comprising N data storage elements, for the storage of data thereon for at least one host processor, comprising the steps of:

configuring, in response to the presence of a first data storage element in said plurality of data storage elements that has the greatest data storage capacity of said plurality of data storage elements, a preference group comprising N data storage elements, inclusive of said first data storage element; and writing data received from a host processor in stripes across less than N of said data storage elements of said preference group.

7. The method of operating a data storage manager of claim 6 wherein said step of writing comprises:

preferentially including said first data storage element in said stripes used to write data received from a host processor across less than N of said data storage elements of said preference group.

8. The method of operating a data storage manager of claim 7 wherein said step of writing further comprises:

selecting, in response to data storage capacity of said first data storage element being exhausted, a second data storage element that has the greatest data storage capacity of the remaining ones of said data storage elements in said preference group; and preferentially including, in response to data storage capacity of said first data storage element being exhausted, said second data storage element in said stripes used to write data received from a host processor across less than N of said data storage elements of said preference group.

9. The method of operating a data storage manager of claim 7 wherein said step of writing further comprises:
   selecting, in response to data storage capacity of said N data storage elements being less than a size of said stripes, a second size of said stripes, said second size being less than said first size.

10. The method of operating a data storage manager of claim 6 wherein said step of writing comprises:
   selecting a first size of said stripes, said first size being less than N; and
   selecting, in response to data storage capacity of a plurality of said N data storage elements being exhausted, a second size of said stripes, said second size being less than said first size.

* * * * *